(12) United States Patent
Schindler et al.

(10) Patent No.: US 10,401,039 B2
(45) Date of Patent: Sep. 3, 2019

(54) EVALUATION OF HEATING LIQUID PRESSURE DROPS IN A HYDRONIC HEATING SYSTEM

(71) Applicant: Ademco Inc., Golden Valley, MN (US)

(72) Inventors: Zdenek Schindler, Prague (CZ); Marek Sikora, Kurim (CZ)

(73) Assignee: Ademco Inc., Golden Valley, MN (US)

( * ) Notice: Subject to any disclaimer, the term of this patent is extended or adjusted under 35 U.S.C. 154(b) by 141 days.

(21) Appl. No.: 15/445,849

(22) Filed: Feb. 28, 2017

(65) Prior Publication Data
US 2018/0245801 A1    Aug. 30, 2018

(51) Int. Cl.
| F24D 19/10 | (2006.01) |
| F24D 19/02 | (2006.01) |
| F24D 3/02 | (2006.01) |
| F24D 3/00 | (2006.01) |
| G01M 3/28 | (2006.01) |
| G01M 3/32 | (2006.01) |
| F24D 13/02 | (2006.01) |

(52) U.S. Cl.
CPC ............ *F24D 19/1009* (2013.01); *F24D 3/00* (2013.01); *F24D 3/02* (2013.01); *F24D 19/02* (2013.01); *G01M 3/2815* (2013.01); *G01M 3/3227* (2013.01); *F24D 2220/02* (2013.01); *F24D 2220/042* (2013.01); *F24D 2220/046* (2013.01); *F24D 2220/048* (2013.01)

(58) Field of Classification Search
CPC ...... F24D 19/1009; F24D 19/02; F24D 13/02; F24D 2220/02; F24D 2220/042; F24D 2220/046; F24D 3/02
USPC ..................................... 237/8 A, 2 A, 12, 81

IPC .......................... F24D 19/10,19/02, 13/02, 3/02
See application file for complete search history.

(56) References Cited

U.S. PATENT DOCUMENTS

| 7,010,925 | B2 * | 3/2006 | Sienel | ...................... F25B 9/008 62/115 |
| 7,296,426 | B2 * | 11/2007 | Butler | ...................... F25B 49/02 62/181 |
| 7,966,152 | B2 | 6/2011 | Stluka et al. | |

(Continued)

FOREIGN PATENT DOCUMENTS

| CN | 205119225 U | 3/2016 |
| CN | 105721501 A | 6/2016 |

(Continued)

OTHER PUBLICATIONS

"JP_11344251_A_M—Machine Translation.pdf", machine translation, AIPN Japan Patent Office, Mar. 21, 2019.*

(Continued)

*Primary Examiner* — Gregory L Huson
*Assistant Examiner* — Daniel E Namay
(74) *Attorney, Agent, or Firm* — Shumaker & Sieffert, P.A.

(57) ABSTRACT

A hydronic heating system that may depend on pressure in the system for smooth operation. The pressure may be monitored. Pressure in the system may indicate health of the heating system. Certain pressures or variations of pressures may indicate one or more conditions in the system which may be good or adverse. An example of an adverse condition may be leakage of fluid from the system. Analyzes of pressures detected in the heating system may be performed by a computer programmed to indicate conditions of the system that are reflected by the detected pressures.

20 Claims, 6 Drawing Sheets

(56) References Cited

U.S. PATENT DOCUMENTS

| | | | |
|---|---|---|---|
| 8,659,302 B1* | 2/2014 | Warren | G05D 23/19 |
| | | | 324/550 |
| 8,805,000 B2 | 8/2014 | Derby et al. | |
| 9,009,001 B2 | 4/2015 | Vass et al. | |
| 9,256,846 B2 | 2/2016 | Stluka et al. | |
| 9,477,242 B2* | 10/2016 | Kovalcik | G05D 23/1919 |
| 2003/0091091 A1* | 5/2003 | Patterson | G01K 7/42 |
| | | | 374/141 |
| 2005/0268625 A1* | 12/2005 | Sienel | F25B 9/008 |
| | | | 62/129 |
| 2009/0264060 A1* | 10/2009 | Livchak | B08B 15/023 |
| | | | 454/61 |
| 2011/0135289 A1* | 6/2011 | Kayser | F24D 17/0031 |
| | | | 392/449 |
| 2013/0048745 A1* | 2/2013 | Johnson, Jr. | F22B 35/00 |
| | | | 237/8 A |
| 2014/0262134 A1* | 9/2014 | Arensmeier | F24D 19/1084 |
| | | | 165/11.2 |
| 2015/0127165 A1 | 5/2015 | Quam et al. | |
| 2015/0127167 A1 | 5/2015 | Quam et al. | |
| 2015/0127168 A1 | 5/2015 | Quam et al. | |
| 2015/0127169 A1 | 5/2015 | Quam et al. | |
| 2015/0127170 A1 | 5/2015 | Quam et al. | |
| 2015/0127171 A1 | 5/2015 | Quam et al. | |
| 2015/0167989 A1* | 6/2015 | Matsuoka | F24D 19/10 |
| | | | 700/276 |
| 2015/0276238 A1* | 10/2015 | Matsuoka | G05B 15/02 |
| | | | 700/278 |
| 2015/0276239 A1* | 10/2015 | Fadell | G05D 23/1905 |
| | | | 237/2 A |
| 2015/0323211 A1* | 11/2015 | Abiprojo | F24D 19/1084 |
| | | | 236/1 C |
| 2015/0369504 A1 | 12/2015 | Flaherty et al. | |
| 2016/0216007 A1* | 7/2016 | Harbin, III | H02J 13/0006 |
| 2016/0252267 A1 | 9/2016 | Davalos et al. | |
| 2016/0273786 A1* | 9/2016 | Day | F24D 19/0092 |
| 2017/0127172 A1 | 5/2017 | Quam et al. | |
| 2017/0138624 A1* | 5/2017 | Kriz | F24D 19/1081 |
| 2017/0362801 A1* | 12/2017 | Van Goor | F17D 1/05 |
| 2018/0142915 A1* | 5/2018 | Mady | F24F 11/61 |

FOREIGN PATENT DOCUMENTS

| | | | |
|---|---|---|---|
| DE | 60012913 T2 | | 9/2005 |
| DE | 102007010803 B4 | | 6/2009 |
| DE | 102011118565 A1 | | 5/2013 |
| EP | 1177682 B1 | | 8/2004 |
| EP | 1460355 A1 | | 9/2004 |
| EP | 2130104 B1 | | 6/2013 |
| EP | 2517137 B1 | | 7/2014 |
| EP | 2921926 A1 | | 9/2015 |
| EP | 3001115 A2 | | 3/2016 |
| EP | 3026875 A1 | | 6/2016 |
| GB | 2405702 A | | 3/2006 |
| GB | 2528142 A | | 1/2016 |
| GB | 2530086 A | | 3/2016 |
| JP | 11344251 A | * | 12/1999 |
| JP | 2001317794 A | * | 11/2001 |
| WO | 1989001112 | | 2/1989 |
| WO | 0144889 A2 | | 6/2001 |
| WO | 2007004755 A1 | | 1/2007 |
| WO | 2010120442 A2 | | 10/2010 |
| WO | 2012036939 A2 | | 3/2012 |
| WO | 2013071999 A1 | | 5/2013 |
| WO | 2013166325 A1 | | 11/2013 |
| WO | 2015020694 A1 | | 2/2015 |
| WO | 2015056967 A1 | | 4/2015 |
| WO | 2015154417 A1 | | 10/2015 |
| WO | 2015167057 A1 | | 11/2015 |
| WO | 2016038374 A1 | | 3/2016 |
| WO | 2016062174 A1 | | 4/2016 |
| WO | 2016089416 A1 | | 6/2016 |
| WO | 2016093676 A2 | | 6/2016 |
| WO | 2016095703 A1 | | 6/2016 |

OTHER PUBLICATIONS

"JP_2001317794_A_M—Machine Translation.pdf", machine translation, AIPN Japan Patent Office, Mar. 21, 2019.*

PCT/US2018/020072, International Search Report & Written Opinion dated May 2, 2018.

* cited by examiner

EVALUATION OF HEATING LIQUID PRESSURE DROPS IN A HYDRONIC HEATING SYSTEM

BACKGROUND

The present disclosure pertains to heating mechanisms and particularly to hydronic heating systems.

SUMMARY

The disclosure reveals a hydronic heating system that may depend on pressure in the system for smooth operation. The pressure may be monitored. Pressure in the system may indicate health of the heating system. Certain pressures or variations of pressures may indicate one or more conditions in the system which may be good or adverse. An example of an adverse condition may be leakage of fluid from the system. Analyses of pressures detected in the heating system may be performed by a computer programmed to indicate conditions of the system that are reflected by the detected pressures.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Smooth operation of hydronic heating systems may depend on pressure in the piping subsystem. In a cold state, liquid may fill the system with a recommended pressure. During operation, the pressure may vary in dependence on fluid temperature; the pressure may increase, if the pump is running. The pressure may be kept within bounds with the help of an expansion vessel, which can ensure proper operation of heating.

A possible fault may be leakage of the system. The amount of heat fluid may decrease due to the leakage in the system, which is indicated by a sudden, fast, or slow pressure decrease. In case of a sudden pressure drop, the warning may be often issued automatically, or the pressure meter may show the pressure under the limit to the user. Emergency repair by a technician may be necessary.

Fast pressure drops may indicate considerable leakage, but the repair may sometimes be delayed, if the system is refilled. However, serious failure of the heating system, or serious compromise or threat of the home comfort heating system.

Another situation may be where the leakage is not very heavy and the pressure drops down only slowly. This pressure drop may be superimposed by normal variations of pressure. A cautious user may read periodically the pressure meter, and at least may refill the system if the pressure drops down below critical limit. A careless user may miss the slow process and react only if an error is indicated, such as if the system automatically switches off or if the heating malfunction is sufficiently obvious.

Figure 4A:
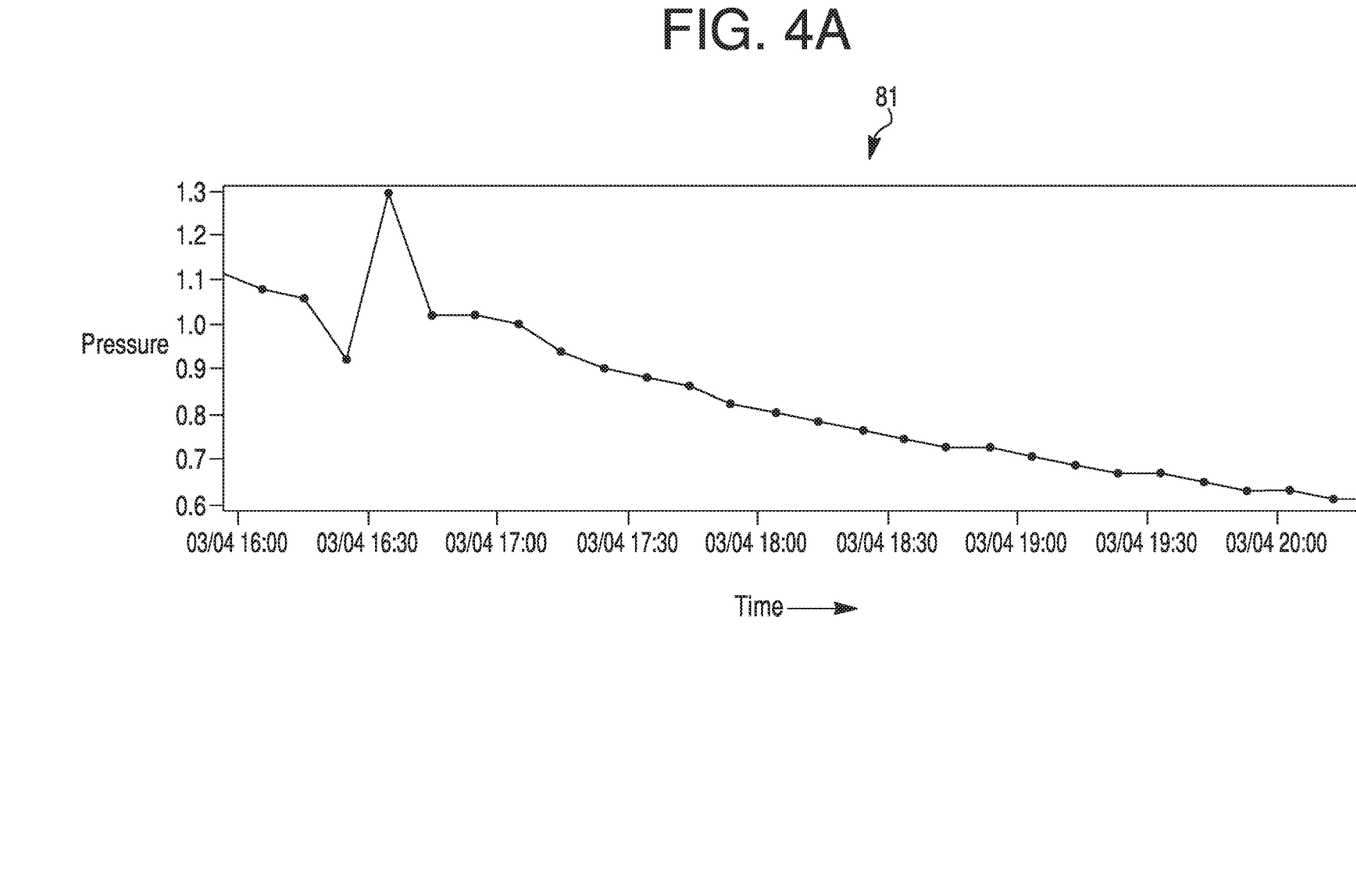
FIGS. 4a, 4b and 4c are diagrams showing sudden, fast and slow pressure drops, respectively, due to leakages.
Figure 4B:
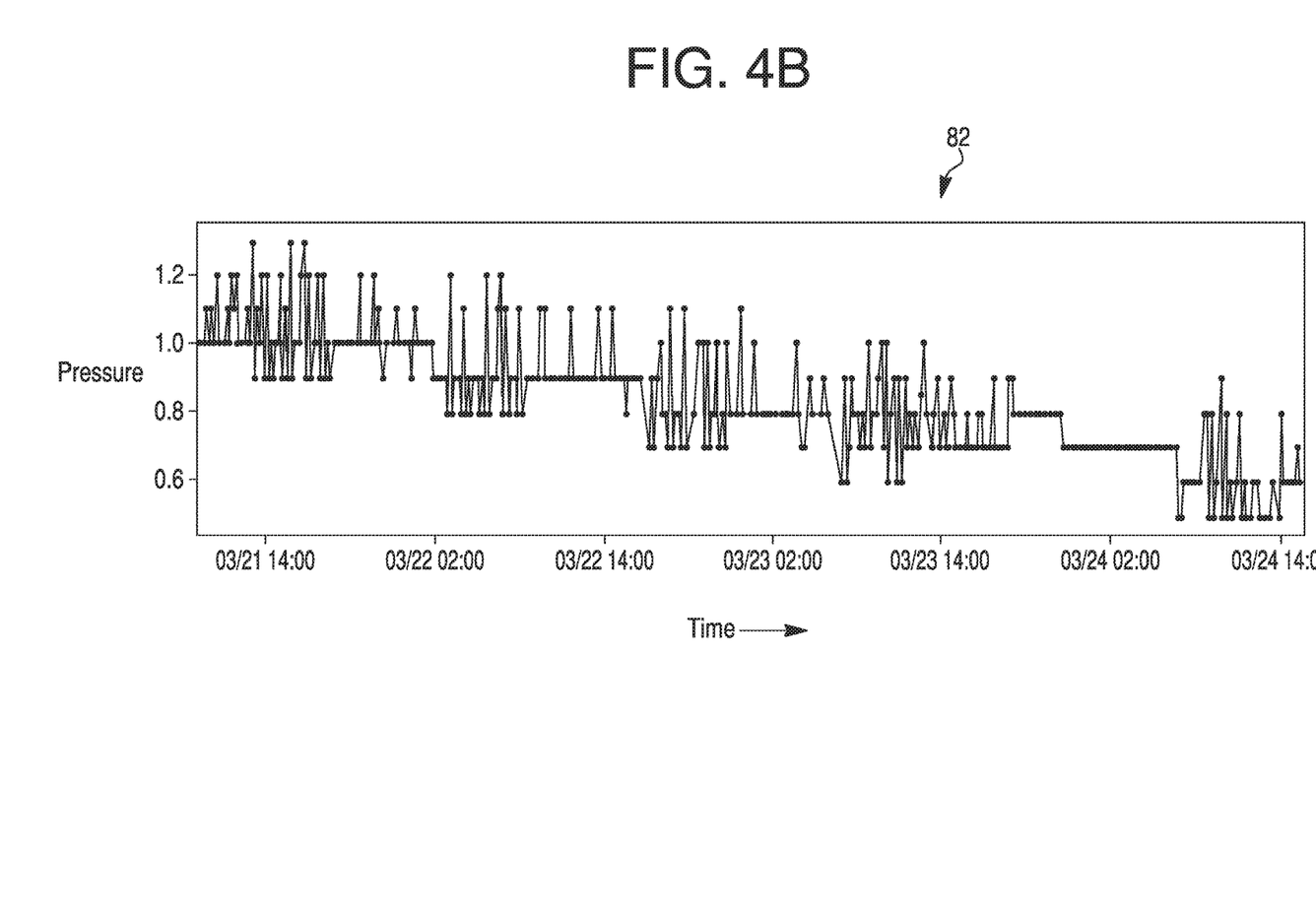
Figure 4C:
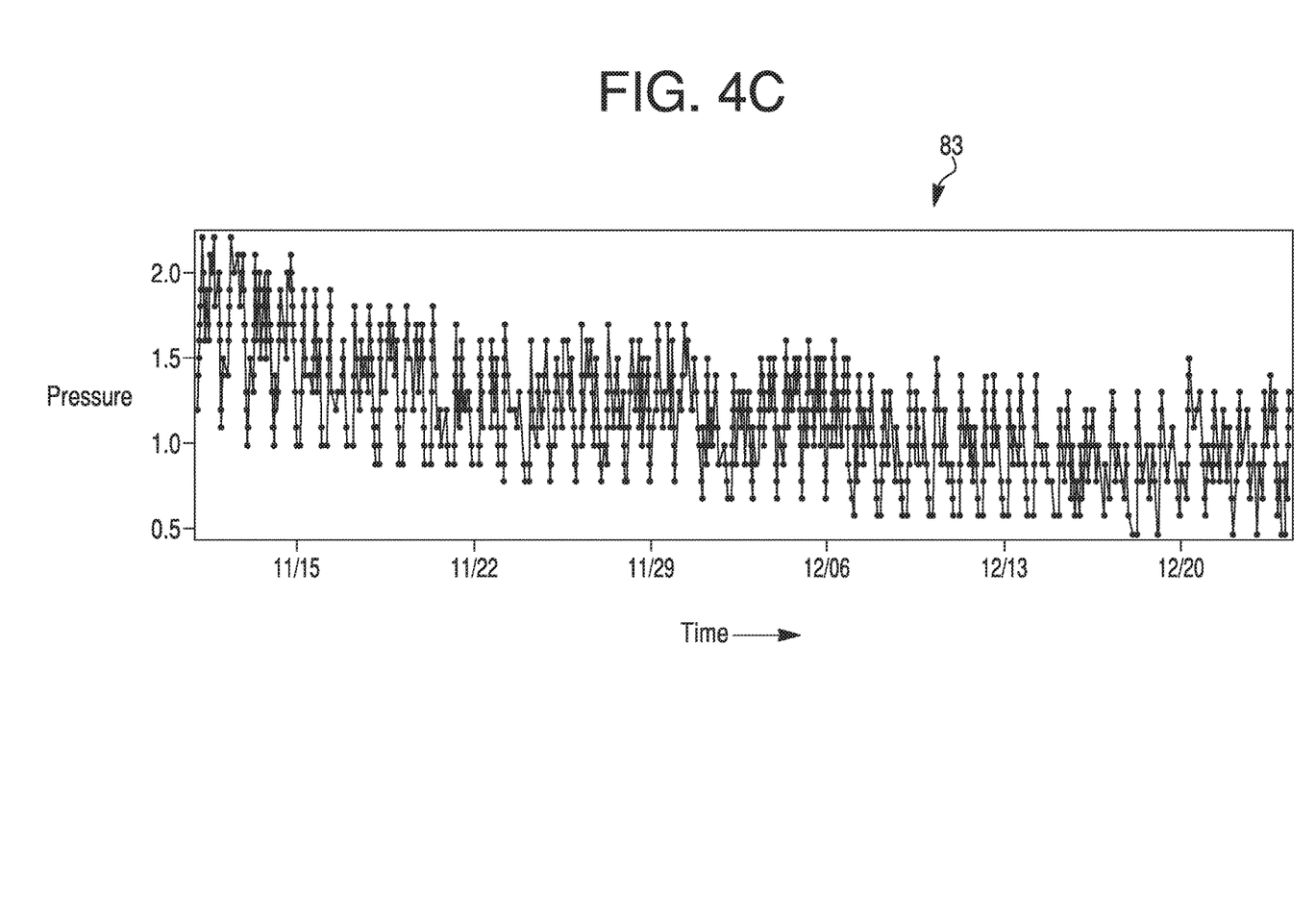

A line between the three kinds of leakages may sometimes be quite fine, especially the latter two kinds; but to give some idea, one may say that a sudden pressure drop can be quantified by a pressure decrease by more than 0.5 in less than 3 hours, a fast pressure drop means that the same pressure decrease can be over the period of 1-2 days, and a slow pressure decrease can be over a period of several weeks. These leakages are illustrated on real-life examples in charts 81, 82 and 83 of FIGS. 4a, 4b and 4c, respectively.

If the heating is maintained by a service company and remotely monitored, it may be important for the maintenance scheduling to get known that the fault (e.g., a leakage) has emerged, what is its extent—the speed of pressure decrease, and to estimate, when the pressure may get below a critical value. This information may be used to improve the economy of the system service and reduce the number of emergency actions by service technicians. Proper notification to the service company may also be important.

The present improvement of a pressure monitoring system may consist in remote monitoring of heating liquid pressure, processing of received values, modeling of the leakage if it has emerged, estimation of time to reach the critical pressure level, and consistent notification about the system state. The goal may be to provide information for scheduling a repair action by a service company or issue a warning for the home owner and request a timely refill of the system.

In the present solution, a signal from a pressure gauge may be collected with sufficient frequency either locally or remotely. In case of sudden pressure drop below the critical value, the notification may be immediately issued, which is however not necessarily the subject of the present approach. A time series of the pressures may be evaluated, typically once a day, e.g., at midnight or before the heating is restarted after a night reduction of heating. As the present approach aims at a slow pressure decrease, a daily evaluation may be a sufficient frequency.

The pressure may vary due to changes of liquid temperature and pump speed during the day. Therefore, an envelope of minimal pressures in the system is searched. The day may be divided into several intervals, and minima in these intervals may be extracted. The daily result or results may be added to the time series of past evaluations.

Progress of the pressure decrease may be modeled by various functions. Moderate speed of pressure decrease may be approximated by a simple shifted exponential or hyperbolic function of time. Slow pressure decrease may be approximated by a linear function, with a small decrease rate constant. Here, the predicted time of failure may be shorter than in the model noted above. A repair in the case of a slow deterioration of pressure need not necessarily be urgent and thus the main purpose of the present prediction is to issue a warning that the system is not in full health.

The stored time series of pressure minima may be used to fit the model parameters. A future predicted course of pressure evolution may be computed and the time point, where the curve intersects critical value of the pressure, may be issued as a prediction of a critical situation for the latest time of the necessary liquid refill or check for the system.

The treatment of failure notifications may be determined by two parameters: 1) The predicted time to reaching a critical pressure level, at which the notification is issued; and 2) The duration of regular pressure after the pressure is restored, needed for clearing the previously issued notification.

The heating system should be equipped with a pressure gauge connected to a suitable device for data transfer. At a remote location, a central computing system may receive data from virtually all sites with the present equipment. Every day the present central computing system may evaluate pressures at each site by the above noted approach and store evaluations in a database. If the database for a site contains sufficient number of values, the system may evaluate whether there is a pressure decrease. If the pressure decrease is indicated, one of two models may be created over the data and a curve describing pressure decrease may be constructed. The time, where the curve intersects the value of critical pressure, may be taken as a predicted time of a critical fault. Considering current state of the art of Internet of Things, all this functionality may be located on site in a local smart home controller or embedded in the boiler or heat exchanger, and only the result—predicted critical time to failure—may be reported to a central computing system The recipient of this prediction, which could be a service organization, may assign priorities of required repair actions and assemble an economically optimal trip plan for service or repair person. The information of probable critical pressure time may be also reported to the home owner or residents via the heating controller. Also time to necessary refill (which may be shorter than time to failure due to some safety time period) may be reported to the owner. Timely refill prevents the system damage before a professional serviceman comes to make a check and repair.

The system may need to be temporarily worked around or repaired in the meantime such as for a leakage (e.g., the home owner refilling the system), the notification flag may be cleared. An expert may be needed for a permanent repair.

Some advantages of this approach may incorporate the service of heating systems being optimally planned, the number of emergency service trips being minimized, and heating systems being maintained in time with minimum or no potential damage.

Figure 1:
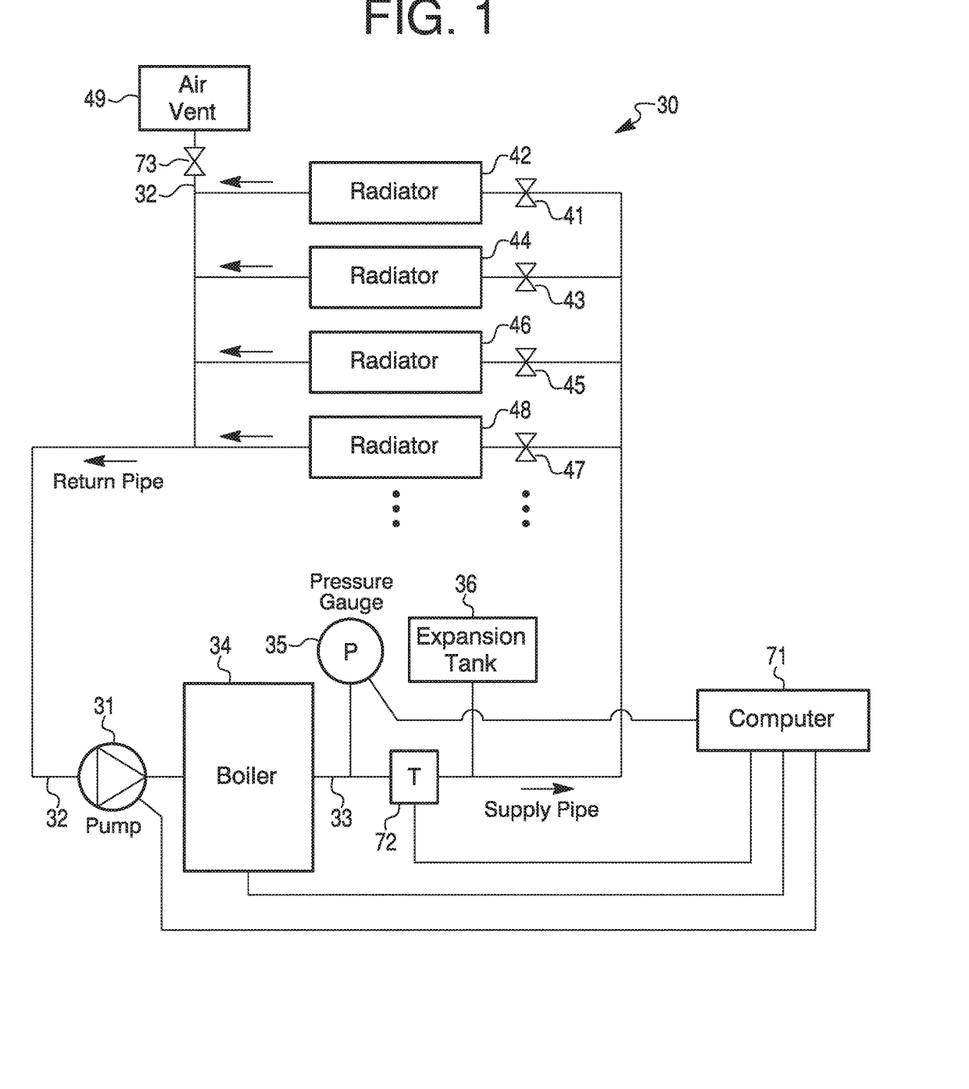
FIG. 1 is diagram of an example hydronic heating system that may incorporate the present approach.

FIG. 1 is diagram of an example hydronic heating system 30 to which the present approach and system may be applied. There may be other hydronic systems having various configurations to which that the present approach may be applied. A pump 31 may be situated on a return line 32, as shown, or situated alternatively on a supply line or pipe 33. Return line or pipe 32 may be connected to an input of a boiler 34. A heat exchanger, heater or other fluid heating mechanism may be used in lieu of the boiler. Supply pipe 33 may be connected to an output of boiler 34. A pressure gauge 35 may be attached to supply pipe 33. Also, an expansion tank 36 may be connected to supply pipe 33. Pipe 33 may go to one or valves, each of which may be connected to a radiator or an underfloor heating or radiative mechanism. In example system 30, there may be valves 41, 43, 45 and 47 that may be connected to inputs of radiators 42, 44, 46 and 48, respectively. The outputs of the radiators may be connected to return pipe 32. At an end of return pipe 32 may be an air vent 49 that can be opened to let air out of system 30. Air vent 49 may have a valve 73 at its input from pipe or line 32. A computer 71 may be connected to pressure gauge 35. A temperature sensor 72 may be situated at, on or in supply pipe or line 33 connected to the output of boiler or fluid heater 34. An output of temperature sensor 72 may be connected to computer 71. Also pump 31 and boiler, fluid heater or a heat exchanger 34 may be connected to computer 71. Heat may be provided for system 30 from an external source such as a district heating plant.

Figure 2:
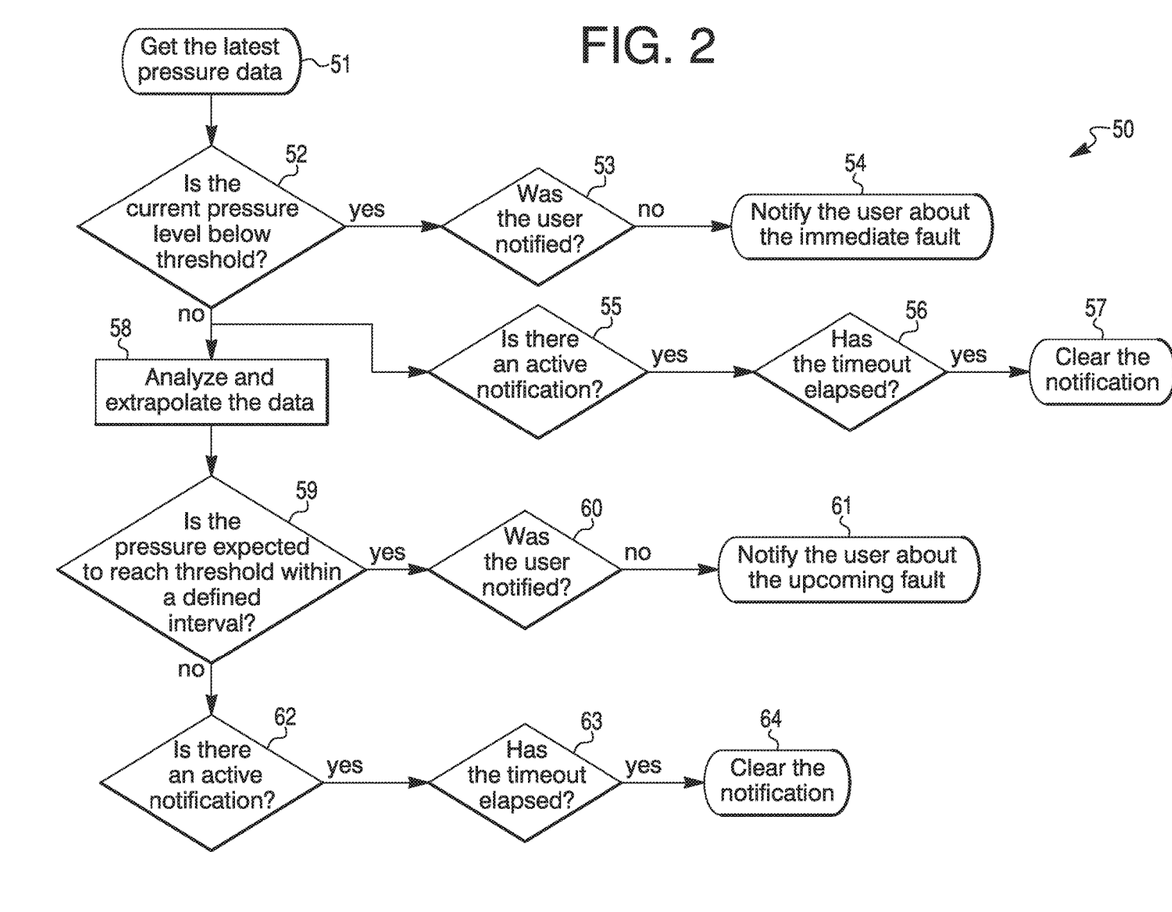
FIG. 2 is a flow diagram that reveals the present approach and system that may be used to evaluate heating liquid pressure drops in a hydronic heating system.

FIG. 2 is a flow diagram 50 that reveals the present approach and system that may be used to evaluate heating liquid pressure drops in an example hydronic heating system, such as example system 30 revealed herein. The latest pressure data may be obtained, for instance, from a gauge 35 at symbol 51. A question of whether a current pressure level is below a pre-determined level may be asked at symbol 52. If an answer is "yes", then a question of whether a user was notified may be asked at symbol 53. If the user was not notified, then the user should be notified at symbol 54. In other words, this branch may represent a "sudden pressure drop" situation. When the pressure drops below the critical level, the user should be notified immediately and there is no need to execute the calculation.

If the answer to the question at symbol 52 is no, then a question whether there is an active notification may be asked at symbol 55. If the answer is yes, then a question of whether the timeout has elapsed may be asked at symbol 56. If the answer is yes, then the notification may be cleared at symbol 57. This may represent a situation when the system has recovered from the pressure drop. The pressure may be above a critical level for some time, so that one can clear the notification. One may still want to calculate the slow decrease to potentially detect the trend and create a model of leakage.

Again, recognizing the "no" answer to the question at symbol 52, the pressure data may be analyzed and extrapolated. Following symbol 58, a question of whether the pressure in system 30 is expected to reach a pre-determined threshold within a defined interval. If an answer is yes, then a question of whether the user was notified may be asked at symbol 60. If an answer is no, the user may be notified about an upcoming fault at symbol 61.

If the answer to the question at symbol 59 is no, then a question of whether there is an active notification may be asked at symbol 62. If an answer is yes, then a question of whether a timeout has elapsed may be asked at symbol 63. If an answer is yes, then the notification may be cleared at symbol 64.

Figure 3:
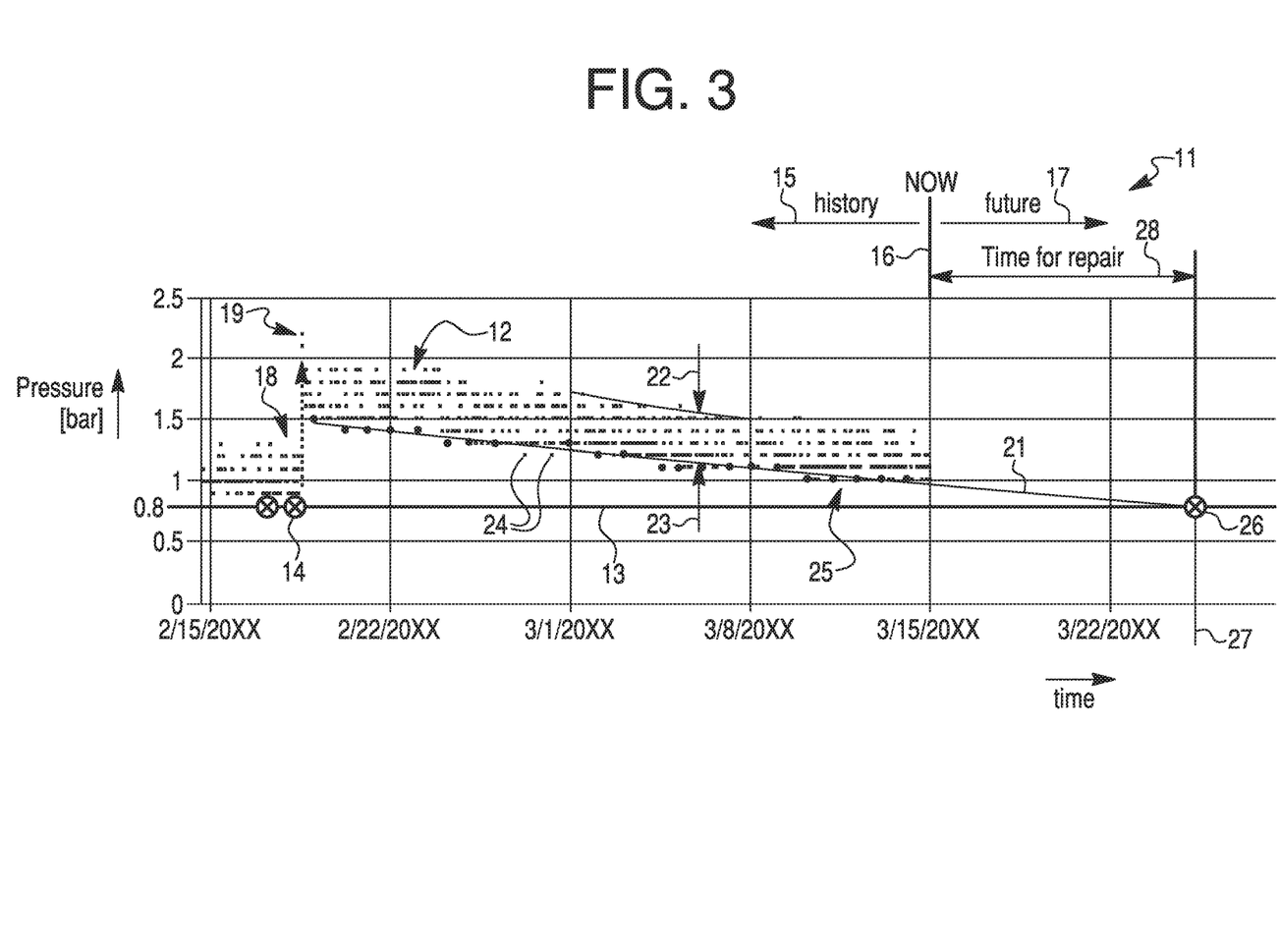
FIG. 3 is a diagram of pressure versus time in a hydronic heating system, which may be a basis for developing a model.

FIG. 3 is a diagram of pressure versus time, depicting a pressure history, in a hydronic heating system particularly at March 15 in graph 11 as noted by vertical line 16. A model may be developed from pressure data. A time range of the graph may be shown to be from February 15 through March 22. The pressure data may be noted in bar units. The marks 12 are points of pressure measurements. At 0.8 bar is a critical pressure line 13. Symbol 14 indicates where the critical pressure was attained. Line 15 indicates a region of historical data and line 17 indicates a region of future predicted data. At area 18 and moving to the right to a dotted line 19 may indicate where liquid is refilled, pressure is restored, but with the fault not yet repaired. Line 21 may be an approximation of a recent gradual pressure drop by a fixed exponential curve. Line 22, along with line 23 that is a part of line 21, may indicate variations of pressure in the system. Points 24 may be discarded outliers. Round dots 25 along line 21 may be regarded as minima in intervals. These minima may be taken for an approximation (i.e., a modeling of a leakage). Symbol 26 along line 13 may indicate a predicted critical state. Vertical line 27 indicates a latest time of the next potentially compensatory refill. A time period between the present moment and the predicted critical state or latest time for the next compensatory refill may be regarded as an amount of time available for repair which is indicated by a line 28 that runs between line 16 and line 27.

To recap. a hydronic heating system may incorporate a fluid heating mechanism for a heating system; one or more radiators having a fluid input connected to a fluid output of the fluid heating mechanism, and having a fluid output connected to a fluid input of the fluid heating mechanism; a pump having a fluid connection in series between the fluid heating mechanism and the one or more radiators; a pressure gauge connected at the fluid output of the fluid heating mechanism, and having a signal output indicative of detected pressure at the fluid output of the fluid heating mechanism; and a computer connected to the signal output at the pressure gauge. The computer may analyze signals indicative of detected pressures from the pressure gauge.

The detected pressures that are indicated by the computer may be correlated to conditions of the system.

The system may further have a temperature sensor at the output of the fluid heating mechanism. The temperature sensor may have a signal output indicative of temperature at the output of the fluid heating mechanism, and the signal output may be connected to the computer.

In a cold state, the fluid heating mechanism and the one or more radiators may contain a fluid under a predetermined pressure.

A pressure decrease along a series of the detected pressures from old to new may indicate a leakage in the heating system, according to the computer.

A pressure change of a first predetermined magnitude may be signaled with an automatically issued warning. A pressure change of a second predetermined magnitude may indicate a leakage in the heating system, which can be delayed by refilling the heating system. The pressure change of a third predetermined magnitude pressure indicative of being below a critical value in the heating system, may result in an immediate notification.

The computer may develop models of pressure loss or leakage from pressures received over time from the pressure gauge. The computer may perform one or more actions selected from a group comprising checking heating fluid pressure, processing pressure values, providing leakage models, estimating time to reach a critical pressure, providing notifications of a state of the heating system, issuing warnings, and indicating appropriate times to refill the heating system.

A time series of pressures may be evaluated at one or more periodical times selected from a group comprising minutely, hourly, daily, and weekly.

Periodical evaluations of pressures may be added to a time series of past evaluations.

Pressure changes may be modeled by functions at the computer. A first pressure drop may be where a pressure suddenly drops below a critical level. A second pressure drop may be where the pressure drops fast two or less days to drop below a critical level and more slowly than the first pressure drop. A third pressure drop may be where the pressure drops more slowly than the second pressure drop.

A stored time series of pressure minima may be used to fit model parameters; a future predicted course of a curve to reveal a pressure evolution may be computed and a time point where the curve intersects a critical value of the curve of the pressure evolution may be issued as a prediction of a critical situation for a latest time of a necessary fluid refill or a check of the heating system; and/or a failure notification may be determined by a predicted time to a critical pressure level at which the failure notification is issued, and then a predetermined duration of regular pressure after the pressure drop is restored may be needed for clearing the failure notification.

The computer may evaluate pressures at each site of multiple subsystems of the heating system and store evaluations in a database corresponding to the pressures, respectively.

If the database contains at least a predetermined evaluation having a value, then the computer may determine if there is a pressure decrease. If the pressure decrease is indicated, then a model may be created over the data and a curve describing the pressure decrease may be constructed, and the time, where the curve intersects a value of a critical pressure, may be a predicted time of a critical fault.

The predicted time of the critical fault provided to a recipient may cause the recipient to repair the heating system within the predicted time and thus result in a clearing of a failure notification flag before harm affects the heating system.

An approach for monitoring hydronic heating system, may incorporate pumping fluid through a circulatory subsystem of a hydronic heating system, heating the fluid in the circulatory subsystem, recording pressure data over time with a computer from a pressure sensor coupled to the circulatory subsystem, and performing an analysis of the pressure data to determine health of the circulatory subsystem.

The circulatory subsystem may incorporate one or more heating radiators; a fluid heating mechanism having an output connected to an input of the one or more heating radiators, and having an input connected to an output of the one or more heating radiators; and a pump connected between the radiators and the fluid heating mechanism.

The analysis of the pressure data may reveal a pressure change of a first predetermined magnitude that results in a signal from the computer providing an automatically issued warning; a pressure change of a second predetermined magnitude that results in a signal from the computer providing an indication of a leakage in the circulatory subsystem, which can be delayed by refilling the system; and a pressure change of a third predetermined magnitude that results in a signal from the computer providing an indication of pressure in the circulatory system being below a critical value and thus resulting in an immediate notification.

A pressure monitoring device for a hydronic heating system, may incorporate a radiator assembly, a heater connected to the radiator assembly, a pump connected to the heater and the radiator assembly, a pressure gauge connected to the radiator assembly, and a pressure analyzer connected to the pressure gauge.

The pressure analyzer may record pressures detected by the pressure gauge over time, and deduce conditions of the hydronic heating system from the pressures recorded over time.

The fluid may be a liquid. The radiator assembly may be situated anywhere in, below, above or proximate to a space to be heated.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A hydronic heating system comprising:
a fluid heating mechanism for a heating system;
one or more radiators having a fluid input connected to a fluid output of the fluid heating mechanism, and having a fluid output connected to a fluid input of the fluid heating mechanism;
a pump having a fluid connection in series between the fluid heating mechanism and the one or more radiators, wherein the pump is configured to circulate a heating fluid;
a pressure gauge connected at the fluid output of the fluid heating mechanism, and configured to output pressure signals indicative of detected pressures of the heating fluid at the fluid output of the fluid heating mechanism; and
a computer configured to:
receive the pressure signals;
store a time series of pressure data based on the pressure signals;
determine model parameters based on the pressure data;
determine a time at which a model indicative of future predicted pressure data intersects a critical value: and
generate a failure notification in response to a pressure drop based on a predicted time to a critical value.

2. The system of claim 1, wherein the pressure data is indicative of a health of the hydronic heating system.

3. The system of claim 1, further comprising a temperature sensor at the output of the fluid heating mechanism wherein the temperature sensor is configured to output, to the computer, a temperature signal indicative of a temperature at the output of the fluid heating mechanism.

4. The system of claim 3, wherein in a cold state, the fluid heating mechanism and the one or more radiators contain the heating fluid under a predetermined pressure.

5. The system of claim 1, wherein the computer is configured to determine that a pressure decrease along a series of the detected pressures from old to new is indicative of a leakage in the heating system.

6. The system of claim 1, wherein the computer is configured to at least one of:
automatically issue a warning in response to a pressure change of a first predetermined magnitude,
delay a notification indicating a second pressure change of a second predetermined magnitude indicates a leakage in the heating system in response to refilling the heating system, or
issue an immediate notification in response to a third pressure change of a third predetermined magnitude pressure below a critical value in the heating system.

7. The system of claim 1, wherein:
the computer is configured to determine, based on the model parameters, one or more models of pressure loss or leakage; and
the computer performs, based on the one or more models, one or more actions comprising at least one of monitoring heating fluid pressure, processing the pressure signals, estimating a time to reach a critical pressure, providing notifications of a condition of the heating system, issuing a warning, or indicating appropriate times to refill the heating system.

8. The system of claim 1, wherein a time series of pressures is evaluated at one or more periodical times selected from a group consisting of minutely, hourly, daily, and weekly.

9. The system of claim 8, wherein the periodical evaluations of pressures are added to a time series of past evaluations.

10. The system of claim 1, wherein the failure notification comprises at least one of:
a first pressure drop comprising a sudden pressure drop below a critical level;
a second pressure drop comprising a fast pressure drop below a critical level, wherein a rate of the second pressure drop is greater than the first pressure drop; or
a third pressure drop, wherein a rate of the third pressure drop is greater than the second pressure drop.

11. The system of claim 1, wherein:
the computer is configured to determine the model parameters based on a stored time series of pressure minima.

12. The system of claim 1, wherein the computer is configured to evaluate pressures at each subsystems of a plurality of subsystems of the heating system and store evaluations in a database corresponding to the pressures.

13. The system of claim 12, wherein the computer is configured to, in response to determining a time at which the model indicative of future predicted pressure data intersects the critical value, determine a predicted time of a critical fault.

14. The system of claim 1, wherein the computer is configured to clear a previously generated failure notification in response to a predetermined duration after the pressure drop is restored.

15. A method for monitoring hydronic heating system, comprising:
pumping, by a pump, a heating fluid through a circulatory subsystem of a hydronic heating system;
heating, by a fluid heating mechanism, the heating fluid in the circulatory subsystem;
recording, by a computer, pressure data received from a pressure sensor coupled to the circulatory subsystem;
determining, by the computer, model parameters based on the pressure data; and
determining, by the computer, a time at which a model indicative of future predicted pressure data intersects a critical value and generating a failure notification in response to a pressure drop based on a predicted time to a critical value.

16. The method of claim 15, wherein the circulatory subsystem comprises one or more heating radiators, wherein the fluid heating mechanism comprises an output connected to an input of the one or more heating radiators and an input connected to an output of the one or more heating radiators and wherein the pump is connected between the radiators and the fluid heating mechanism.

17. The method of claim 15, comprising at least one of:
automatically issuing a warning in response to a pressure change of a first predetermined magnitude;
delaying a notification indicating a second pressure change of a second predetermined magnitude indicative of a leakage in the circulatory subsystem in response to refilling the heating system; and issuing an immediate notification in response to a third pressure change of a third predetermined magnitude below a critical value.

18. A pressure monitoring device for a hydronic heating system, comprising:
- a radiator assembly;
- a heater connected to the radiator assembly;
- a pump connected to the heater and the radiator assembly;
- a pressure gauge connected to the radiator assembly; and
- a pressure analyzer connected to the pressure gauge, wherein the pressure analyzer is configured to:
  - receive, from the pressure gauge, pressure signals
  - store a time series of pressure data based on the pressure signals,
  - determine model parameters based on the pressure data,
  - determine a time at which a model indicative of future predicted pressure data intersects a critical value, and
  - generate a failure notification in response to a pressure drop based on a predicted time to a critical value.

19. The device of claim 18, wherein the pressure data is indicative of a health of the hydronic heating system.

20. The device of claim 19, wherein:
- the heating fluid is a liquid; and
- the radiator assembly is configured to be situated in, below, above, or proximate to a space to be heated.

* * * * *